Aug. 8, 1950  E. J. WITCHGER  2,518,414
DEMOUNTABLE ADJUSTING MEANS FOR MACHINE GAUGES
Filed April 28, 1947
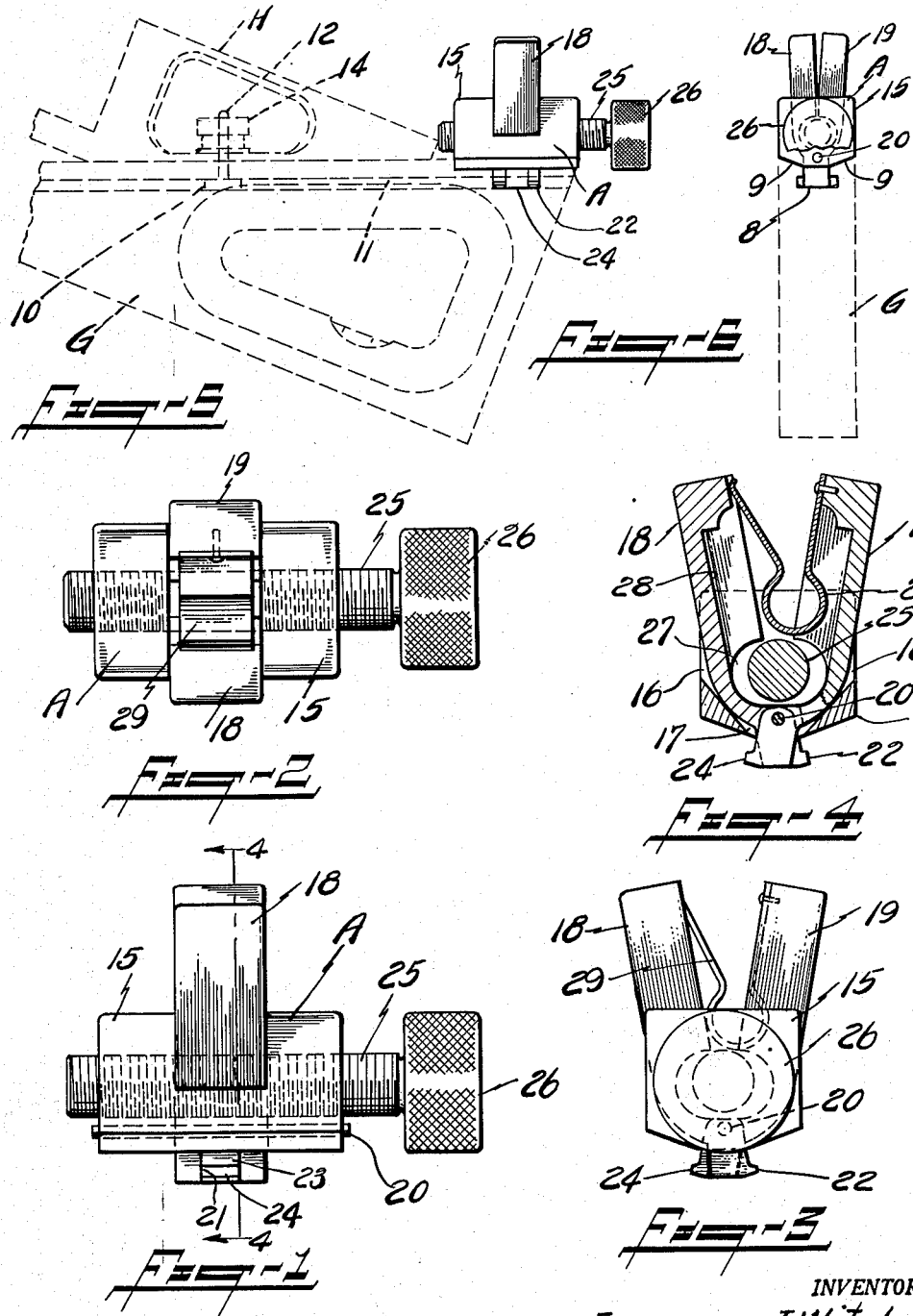
INVENTOR.
Eugene J. Witchger
BY
Frank C. Isarman
Attorney.

Patented Aug. 8, 1950

2,518,414

UNITED STATES PATENT OFFICE 2,518,414

DEMOUNTABLE ADJUSTING MEANS FOR MACHINE GAUGES

Eugene J. Witchger, Saginaw, Mich., assignor to The Lufkin Rule Co., Saginaw, Mich.

Application April 28, 1947, Serial No. 744,487

3 Claims. (Cl. 33—162)

This invention relates to gauges for use by machinists and mechanics in shop practice, and one of its several objects is to provide a gauge for the measurement of heights on planers, shapers, and checking on surface plate as well as for use in connection with gauge blocks.

One of the prime objects of the invention is to provide a gauge embodying certain refinements in its features of adjustment, that permits the gauge head to be set quickly at roughly approximate position on the gauge, and provide adjustable means associated with the gauge for thereafter adjusting said head with precision, to a final setting.

Another object is to provide a simple and substantial adjusting means that can be readily mounted, that is automatically secured against accidental displacement when set, and by means of which extremely fine and accurate adjustment can be made.

Another object is to provide a simple and economical adjusting mechanism that can be easily and quickly mounted on the hypotenuse surface of a gauge, which is readily adjustable thereon, and which is securely held in set position.

With the above and other objects in view, the present invention consists of the combination and arrangement of parts, hereinafter more fully described, illustrated in the accompanying drawing, and more particularly pointed out in the appended claims, it being understood that changes may be made in the form, size, proportion, and minor details of construction, without departing from the spirit, or sacrificing any of the advantages of the invention.

In the drawing:

Fig. 1 is an enlarged, side-elevational view of my adjusting mechanism.

Fig. 2 is a top plan view thereof.

Fig. 3 is an end-elevational view.

Fig. 4 is a transverse-sectional view taken on the line 4—4 of Fig. 1.

Fig. 5 is a side-elevational view showing the adjusting means mounted on a conventional gauge, the broken lines showing the gauge and slidable gauge head.

Fig. 6 is an end-elevational view, the head of the adjusting screw being broken away to show the assembly.

Referring now more specifically to the drawing in which I have shown the preferred embodiment of my invention. The gauge proper is indicated generally at G. This is of conventional design, and an inverted T-shaped slot 8 is provided in the upper inclined face of the gauge, and divides said face into transversely inclined side sections 9 which are pitched towards the slot, and a clamp plate 10 is slidably mounted in the head section 11 of the slot as usual.

The gauge head H is adjustable on the upper edge 8 in the conventional manner, and a clamp screw and nut assembly 12 and 14 respectively serves to clamp it in set position. In the setting of the gauge head for precision measurements, the head is pushed or lightly tapped into position, making minute adjustment somewhat difficult, and I, therefore, provide a slide adjuster A which slides on the upper edge of the gauge in the same manner as the gauge head, and provide manually operable threaded means thereon for minutely adjusting the head, said means comprising a body member 15, the lower face of which is shaped to fit and slide on the side sections 9 of the gauge.

Openings 16 and 17 are provided in the side and bottom walls of the body member at a point spaced equidistant from the ends, and accommodate a pair of clamp members 18 and 19 which are pivotally mounted in the body member by means of the longitudinally disposed pin 20, the lower end of the clamp 18 being bifurcated as shown at 21, and the ends of the bifurcated sections are formed with laterally projecting sections 22 and for a purpose to be presently described.

The companion clamp 19 is formed with a single leg projection 23 which is accommodated in the bifurcated section 21, and the lower edge is also formed with an opposed laterally projecting section 24 similar to the section 22, the lower ends of these clamps being hingedly connected together by means of the pin 20 which is mounted in a body A.

A longitudinally disposed adjusting screw 25 is mounted in the lower section of the body member 15, and is provided with a head 26 as usual, the clamps 18 and 19 being recessed as at 27 to accommodate said screw.

These clamps 18 and 19 are also chamfered as at 28, and one leg of a spring 29 is secured to the inner face of the clamp 19 at a point directly adjacent the upper edge thereof, the opposite leg of said spring bearing against the inner face of the opposite clamp, and tends to force the upper ends of the clamps from each other.

The lower sections of the clamps 18 and 19 are formed to engage and slide in the T-shaped slot 8, and when the clamp is in position shown in Figs. 3 and 4 of the drawing, the sections 22 and 24 are forced outwardly and into locking engagement with the walls of the slot 8 so that it will be firmly locked on the gauge, but when the upper ends of the clamps are forced towards each other, the lower end sections will be disengaged, and the attachment is then freely slidable in either direction.

In practice, the gauge head H is set quickly at a roughly approximate position, after which the clamp members 18 and 19 are forced toward each other, so that the attachment can be moved to bring the end of the adjusting screw 25 into engagement with the lower edge of the gauge head which has been set at roughly approximate position; then by manipulation of the knurled head 26 of the adjusting screw, the gauge head H can be adjusted with precision to a final setting, after which the nut 14 on the screw 12 it tightened to secure the gauge head in set position and prevent accidental displacement thereof during further handling.

From the foregoing, it will be clearly obvious that I have perfected a very simple, practical, and economical adjusting means whereby gauges may be easily and accurately set and held in set position.

What I claim is:

1. The combination with a gauge base having a hypothenuse surface provided with a T-slot coextensive therewith, a gauge head slidably mounted on said hypothenuse surface, an adjusting slide also slidable on said surface and including a body member, spring-pressed clamping members pivotally mounted in said body member and having laterally projecting sections on the lower ends thereof for frictionally engaging the walls of said slot to lock said body in set position, and an adjusting screw mounted in said slide and engageable with said gauge head for adjusting said gauge head as the screw is actuated.

2. The combination as defined in claim 1 in which the body section is recessed to accommodate the spring pressed hingedly connected clamping members, and recesses in said clamps above the pivotal mounting to accommodate the adjusting screw.

3. The combination with a gauge base having a hypothenuse surface provided with a T-slot coextensive therewith, a gauge head slidably adjustable on said surface, an adjusting member slidable in said slot, pivotally connected spring-pressed clamps mounted on said adjusting member and extending therethrough for frictional engagement with the walls of the slot for locking it on the base, and a longitudinally disposed adjusting screw mounted in said adjusting member and engageable with the gauge head for adjusting it to final setting on said base.

EUGENE J. WITCHGER.

REFERENCES CITED

The following references are of record in the file of this patent:

UNITED STATES PATENTS

| Number | Name | Date |
|--------|------|------|
| 875,050 | Conlon | Dec. 31, 1907 |
| 2,353,886 | Findley et al. | July 18, 1944 |